UNITED STATES PATENT OFFICE.

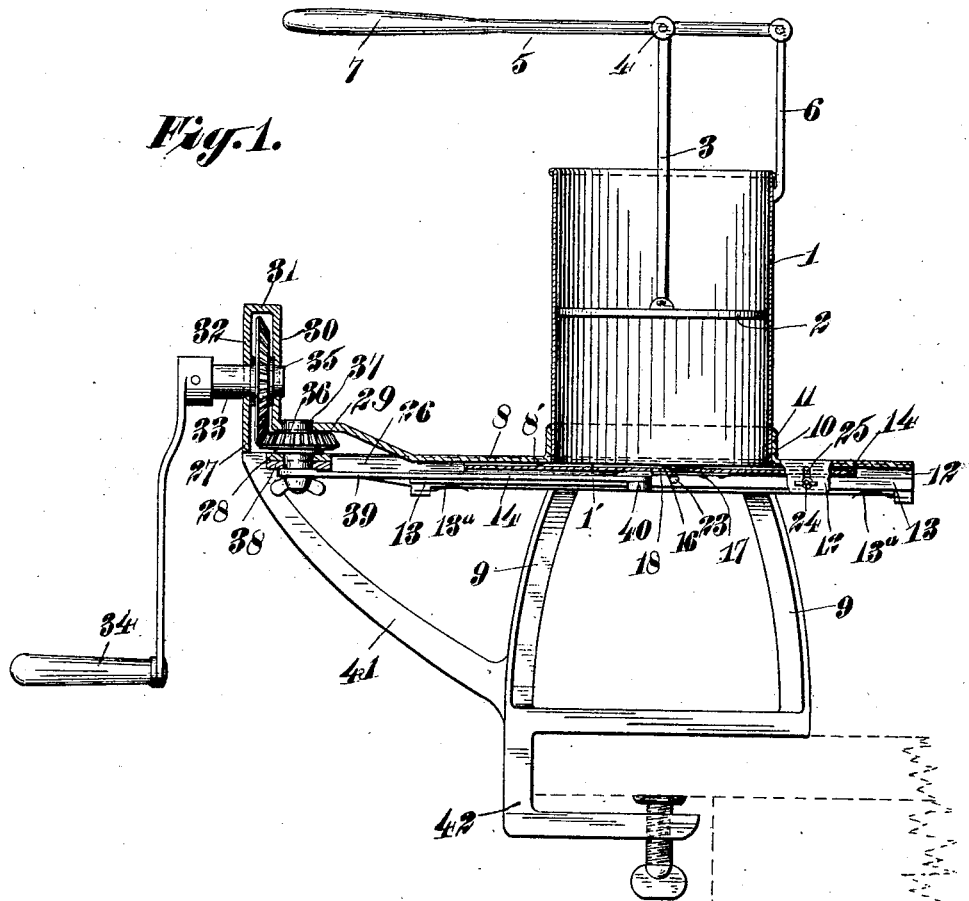

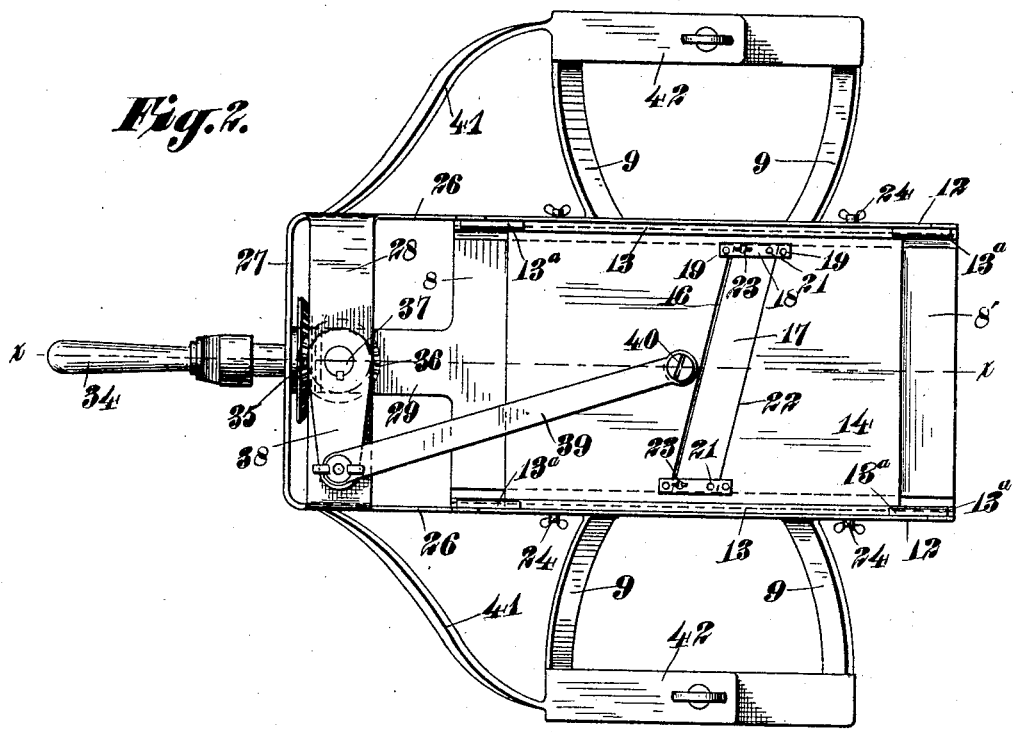

EDWARD P. LANG AND CHARLES J. KALBE, OF CHICAGO, ILLINOIS, ASSIGNORS OF ONE-THIRD TO PATRICK H. HOLLAND, OF CHICAGO, ILLINOIS.

VEGETABLE-SLICER.

No. 925,111.  Specification of Letters Patent.  Patented June 15, 1909.

Application filed May 9, 1908. Serial No. 431,999.

*To all whom it may concern:*

Be it known that we, EDWARD P. LANG and CHARLES J. KALBE, citizens of the United States, residing at Chicago, county of Cook, and State of Illinois, have invented certain new and useful Improvements in Vegetable-Slicers, of which the following is a specification.

Our invention relates to vegetable cutters, and the object of our invention is to provide a device of simple construction and one which may be readily operated to slice vegetables with uniformity.

A further object of our invention is to provide a device of the class mentioned, which may be readily adjusted to make a coarse or fine cut as desired.

A further object of our invention is to provide a culinary article as mentioned, provided with a clamp or clamps for attaching the same to the edge of a table or other support, and having a spread foot or base to permit a pan of suitable size to be placed beneath the cutter.

Other objects will appear hereinafter.

With these objects in view our invention consists generally in a vegetable slicer comprising a hopper, a reciprocatory plate arranged beneath said hopper, a knife arranged in said plate and adjustable means for supporting the plate to vary the cut of the knife.

Our invention further consists in a suitable frame, a hopper mounted on said frame and open at the bottom, a reciprocatory plate closing the bottom of said hopper an adjustable knife on said plate and adjustable ways on said frame for said plate, and means for reciprocating said plate.

Our invention further consists in a device of the class mentioned, comprising a hopper and a cutter arranged beneath the same, in combination with a spread or arched base for the same so arranged as to permit a vessel of comparatively large size to be placed beneath the cutter and clamps at the ends of said base for securing the device to a suitable support.

Our invention further consists in various details of construction and arrangements of parts, all as will be hereinafter described and particularly pointed out in the claims.

Our invention will be more readily understood by reference to the accompanying drawings forming a part of this specification, and in which, Figure 1 is a vertical longitudinal section of a vegetable slicer embodying our invention, in its preferred form, the section being taken on substantially the line $x$—$x$ of Fig. 2, Fig. 2 is a bottom plan view of the device, Fig. 3 is a detail end view of the frame, and Fig. 4 is a detail section illustrating the manner of connecting the blade to the plate and of adjusting the same.

Referring now to the drawings, 1 indicates the hopper which is preferably formed of stout sheet metal. The hopper is preferably cylindrical, although it may be square or any other shape desired, and is open at both top and bottom.

2 indicates a plunger or follower arranged within the hopper and snugly fitting the same. Pivotally connected to the upper face of the follower at substantially its center, is a rod or pitman 3, pivotally connected as at 4 to a lever 5. The lever 5 is pivotally connected to a bracket 6 secured to the hopper 1 and extending a considerable distance above the upper end thereof, so that by turning back the lever, the follower will be readily removed from the hopper to permit insertion of the vegetables to be sliced.

7 indicates a handle on the end of the lever affording convenient means for depressing the follower. The hopper is supported upon a suitable frame which is preferably cast in one piece and comprises generally the horizontal bed plate 8, and the supporting legs 9 which are outwardly and downwardly curved forming an arched or spread base which will permit a pan or vessel of comparatively large size to be placed under the bed plate. The plate 8 is provided with a substantially centrally disposed aperture 10 to receive the lower end of the hopper 1, the hopper extending through said aperture and having its lower end 1' flush with the underface 8' of the plate. The aperture is surrounded by an upwardly extending annular flange 11 fitting snugly about the adjacent portion of the hopper and to which the latter is secured as by soldering. The bed plate 8 is preferably rectangular and is formed with depending flanges 12—12 extending longitudinally along both sides. To the inner faces of the flanges 12 are secured horizontal strips 13—13 forming ways upon which the knife holding plate or reciprocatory plate is mounted.

14 indicates the reciprocatory plate mounted upon the ways 13 and closing the lower end of the hopper 1. The plate 14 is preferably rectangular, and its edges are preferably thickened forming ribs 15 to rest upon the ways 13. The plate 14 is provided with a diagonally disposed slot or aperture 16 in which is arranged a knife blade 17 which is substantially coextensive in size therewith. The aperture 16 and the blade 17 are a trifle wider than the diameter of the hopper, and almost the width of the plate. The knife is secured within the aperture by a pair of metal strips 18 arranged across the ends of the slot and riveted to the underface of the plate as at 19. The butt edge of the blade, that is the edge opposite from the cutting edge 20, is riveted to the strips 18 as at 21. The knife is arranged within the slot 16 and its butt edge rests against the wall 22 of the slot. Threaded through the strips 18, are a pair of thumb screws 23, which impinge against the underface of the blade near the cutting edge.

It is obvious that by turning the screws the height of the cutting edge of the blade above the upper face of the plate, may be nicely adjusted. The members 18 have sufficient resiliency to hold the blade firmly against the ends of the screws. The cutting edge of the blade should work close beneath the underface of the bed plate 8, and to this end the ways 13 are adjustably connected or secured to the flanges 12. To adjustably connect the ways 13 to the flanges, they are provided with thumb-bolts 24 which extend through vertically disposed slots 25 in the flanges 12. After the blade 17 is adjusted by the screws 23 to give the proper cut, the ways 13 are adjusted to bring the edge 20 of the blade close beneath the underface of the plate 8 and the lower end of the hopper.

Arranged beneath the members 13 are springs 13ª which, when the bolts 24 are loosened, yieldingly support the knife in proper position. This facilitates adjusting the device inasmuch as the ways will be automatically and properly positioned as the screws 23 are turned to adjust the knife. The springs are arranged under the end of the ways for obvious reasons.

Arranged at one end of the bed plate 8 is a suitable frame for supporting the drive mechanism, by means of which the plate 14 and knife are reciprocated. This is preferably formed integrally with the frame casting, and comprises the side members 26 which are extensions of the flanges 12 and connected at their outer ends by a transverse member 27. Intermediate of the end of the plate 8 and the transverse bar or member 27 is a horizontal transverse bar 28, the purpose of which will appear hereafter. Extending centrally from the edge of the plate 8 is a longitudinal member 29 which extends diagonally upwardly to a point above the member 28, and then horizontally above the same. The member 29 is then bent upwardly as at 30, off-set as at 31 and then bent downwardly as at 32, connecting at its lower end with the member 27. Rotatably mounted in the vertical portions 30—32, is a horizontal shaft 33 upon the end of which is arranged the crank 34 for turning the same, and fixed to said shaft and arranged within the yoke formed by said portions is a beveled gear 35 meshing with a similar gear 36 arranged between the horizontal portion 29 and the member 28 upon a shaft 37. To the lower end of the shaft 37 is secured a crank arm 38 which is connected by the pitman 39 to the plate 14. The pitman 39 is pivotally connected to the plate in front of the center portion of the knife as at 40.

41 indicates bases extending from the outer ends of the members 26 to the lower ends of the legs 9 to more firmly support the drive mechanism. The lower end of each of the leg members 9 is provided with a clamp 42 by means of which the device may be secured to the edge of a table or other suitable support. By spreading the footing as before described, and by providing the two clamps at a great distance apart, great stability and rigidity is obtained.

Having described our invention what we claim as new and desire to secure by Letters Patent, is:

1. In a device of the class described, a reciprocatory plate having a transverse recess, a knife arranged in said recess, flexible metal strips secured to the underface of said plate and said knife to hold the latter in position, and means passing through said strips for adjusting the angle of the knife to vary the cut, substantially as described.

2. In a device of the class described, a reciprocatory plate having a transverse recess, a knife arranged in said recess, flexible metal strips secured to the under face of said plate and to said knife near the ends thereof to hold the latter in position and screws threaded in said strips and impinging against said knife, substantially as described.

3. In a device of the class described, a bed plate having depending parallel flanges, and a hopper fixed to said plate and opening therethrough, in combination with a reciprocatory plate arranged beneath said bed plate and crossing said hopper, ways on said flanges for said plate, said flanges having vertically disposed slots, adjusting screws extending through said slots into said ways and a knife on said plate, substantially as described.

4. In a device of the class described a bed plate having depending parallel flanges, and a hopper fixed to said plate and opening therethrough, in combination with a reciprocatory plate arranged beneath said bed plate and closing said hopper, ways adjustably mounted on said flanges for said plate, springs arranged beneath said ways, a knife on said reciprocatory plate, and means for adjusting said knife, substantially as described.

In testimony whereof we have signed our names to this specification in the presence of two subscribing witnesses.

EDWARD P. LANG.
CHARLES J. KALBE.

Witnesses:
 JANET E. HOGAN,
 HOWARD S. AUSTIN.